(12) United States Patent
Pesquet-Popescu et al.

(10) Patent No.: US 6,519,284 B1
(45) Date of Patent: Feb. 11, 2003

(54) ENCODING METHOD FOR THE COMPRESSION OF A VIDEO SEQUENCE

(75) Inventors: Beatrice Pesquet-Popescu, Bourg-la-Reine (FR); Marion Benetiere, Nogent-sur-Marne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 416 days.

(21) Appl. No.: 09/616,730

(22) Filed: Jul. 14, 2000

(30) Foreign Application Priority Data

Jul. 20, 1999 (EP) .............................................. 99401823

(51) Int. Cl.$^7$ ................................................ H04N 7/12

(52) U.S. Cl. .................................. 375/240.11; 382/232

(58) Field of Search ....................... 375/240.03, 240.11, 375/240.08, 240.19, 240.22; 348/398.1, 399.1; 382/232, 233, 234, 240, 238; H04N 7/12

(56) References Cited

U.S. PATENT DOCUMENTS

| | | | | |
|---|---|---|---|---|
| 6,141,446 A | * | 10/2000 | Boliek et al. ................ | 382/233 |
| 6,229,927 B1 | * | 5/2001 | Schwartz .................... | 382/248 |
| 6,226,450 B1 | * | 7/2001 | Yip et al. ................... | 382/240 |
| 6,259,819 B1 | * | 7/2001 | Andrew et al. ............. | 382/248 |
| 6,389,074 B1 | * | 5/2002 | Andrew ................. | 375/240.05 |

OTHER PUBLICATIONS

"A New Fast, and Efficient Image Codec Based on Set Partitioning in Hierarchical Trees", By A. Said and W.A. Pearlman, IEEE Transactions on Circuits and Systems for Video Technology, vol. 6, No. 3, Jun. 1996, pp. 243–250.

"Embedded Image Coding Using Zerotrees of Wavelet Coefficients", By J.M. Shapiro, IEEE Transactions on Signal Processing, vol. 41, No. 12, Dec. 1993, pp. 3446–3462.

Artithmetic Coding for Data Compression, By I.H. Witten and Al., Communications of the ACM, Jun. 1987, vol. 30, No. 6, pp. 520–540.

* cited by examiner

Primary Examiner—Nhon Diep
(74) Attorney, Agent, or Firm—Russell Gross

(57) ABSTRACT

The invention relates to an encoding method for the compression of a video sequence divided into groups of frames decomposed by means of a tridimensional wavelet transform. According to this method, based on the hierarchical subband encoding process SPIHT and applied to the bandpass subbands of a spatio-temporal orientation tree defining the spatio-temporal relationship within the hierarchical pyramid of the obtained transform coefficients, a vectorial DPCM, using either constant prediction coefficients or adaptive ones for taking into account scene changes, is used to separately encode the lowest frequency spatio-temporal subband, and the quantification of the prediction error observed when constructing a spatio-temporal predictor for each vector of transform coefficients having components in each frame of said subband is carried out by means of a scalar or vectorial quantization. The final binary stream resulting from these modulation and quantification steps is encoded by a lossless technique minimizing the entropy of the whole message.

6 Claims, 6 Drawing Sheets

ENCODING METHOD FOR THE COMPRESSION OF A VIDEO SEQUENCE

FIELD OF THE INVENTION

The present invention relates to an encoding method for the compression of a video sequence divided in groups of frames decomposed by means of a tridimensional (3D) wavelet transform leading to a given number of successive resolution levels, said method being based on a hierarchical subband encoding process called "set partitioning in hierarchical trees" (SPIHT) and leading from the original set of picture elements (pixels) of each group of frames to transform coefficients encoded with a binary format and constituting a hierarchical pyramid, said coefficients being ordered by means of magnitude tests involving the pixels represented by three ordered lists called list of insignificant sets (LIS), list of insignificant pixels (LIP) and list of significant pixels (LSP), said tests being carried out in order to divide said original set of picture elements into partitioning subsets according to a division process that continues until each significant coefficient is encoded within said binary representation, and a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid.

BACKGROUND OF THE INVENTION

In video compression schemes, the reduction of temporal redundancy is mainly achieved by two types of approaches. According to the first one, the so-called "hybrid" or predictive approach, a prediction of the current frame is computed based on the previously transmitted frames, and only the prediction error is intra-coded and transmitted. In the second one, the temporal redundancy is exploited by means of a temporal transform, which is similar to spatial techniques for removing redundancies. In this last technique, called the 3D or 2D+t approach, the sequence of frames is processed as a 3D volume, and the subband decomposition used in image coding is extended to 3D spatio-temporal data by using separable transforms (for example, wavelet or wavelet packets transforms implemented by means of filter banks). The anisotropy in the 3D structure can be taken into account by using different filter banks in the temporal and spatial directions (Haar filters are usually chosen for temporal filtering since the added delay observed with longer filters is undesirable; furthermore, Haar filters, which are two-tap filters are the only perfect reconstruction orthogonal filters which do not present the boundaries effect).

It was observed that the coding efficiency of the 3D coding scheme can be improved by performing motion estimation/compensation in the low temporal subbands, at each level of the temporal decomposition. Therefore, the present scheme includes motion estimation/compensation inside subbands and the 3D subband decomposition is applied on the compensated group of frames. An entire three-stage temporal decomposition is described in FIG. 1. Each group of frames in the input video sequence must contain a number of frames equal to a power of two (usually, 16, in the present example, 8). The rectilinear arrows indicate the low-pass (L) temporal filtering (continuous arrows) and the high-pass (H) one (dotted arrows), and the curved ones designate the motion compensation between two frames. At the last temporal decomposition level, there are two frames in the lowest temporal subband. In each frame of the temporal subbands, a spatial decomposition is performed. In this framework, subband coding the three-dimensional structure of data can be realized as an extension of the spatial subband coding techniques.

One of the most performant wavelet-based scheme for image compression, which was recently extended to the 3D structure of subbands is the bidimensional set partitioning in hierarchical trees, or 2D SPIHT, described in the document "A new fast, and efficient image codec based on set partitioning in hierarchical trees", by A. Said and W. A. Pearlman, IEEE Transactions on Circuits and Systems for Video Technology, vol.6, N° 3, June 1996, pp.243–250. The basic concepts used in this 3D coding technique are the following: spatio-temporal trees corresponding to the same location are formed in the wavelet domain; then, the wavelet transform coefficients in these trees are partitioned into sets defined by the level of the highest significant bit in a bit-plane representation of their magnitudes; finally, the highest remaining bit planes are coded and the resulting bits transmitted.

A common characteristic of the SPIHT algorithm presented above, as well in its 2D as in its 3D version is that the spatial, respectively the spatio-temporal, orientation trees are defined beginning with the lowest frequency subband, and represent the coefficients related to the same spatial, or spatio-temporal, location. This way, with the exception of the lowest frequency band, all parents have four (in 2D) or eight (in 3D) children. Let (i,j,k) represent the coordinates of a picture element (pixel) in the 3D transform domain: if it is not in the lowest spatio-temporal frequency subband and it is not in one of the last resolution level subbands, then its offsprings have the coordinates:

O={(2i,2j,2k), (2i+1,2j,2k), (2i,2j+1,2k), (2i,2j,2k+1), (2i+1,2j+1,2k), (2i+1,2j,2k+1), (2i,2j+1,2k+1), (2i+1, 2j+1,2k+1)}.

For the sake of simplicity, the still picture case is illustrated in FIG. 2 (subbands s-LLLL, s-LLLH, etc . . . ).

In the image coding domain, compression algorithms by zerotrees were extensively studied in the last years and several improvements have been proposed. For example, in the MPEG-4 standard, a variant of such an algorithm (see for instance the document "Embedded image coding using zerotrees of wavelet coefficients", by J. M. Shapiro, IEEE Transactions on Signal Processing, vol. 41, N° 12, December 1993, pp.3445–3462) was adopted for the still picture coding mode, in which the lowest spatial subband is independently coded using a DPCM technique. Subsequently, spatial orientation trees are formed starting in the detail subbands (all subbands except s-LLLL, the first one), which is illustrated in FIG. 3.

SUMMARY OF THE INVENTION

It is an object of the invention to propose a new type of video encoding method, in the 3D case.

To this end, the invention relates to an encoding method such as defined in the introductive paragraph and which is moreover characterized in that:

(A) a vectorial differential pulse code modulation (DPCM) is used to separately encode the lowest frequency spatio-temporal subband, or approximation subband, according to the following conditions:
  (a) a spatio-temporal predictor, using not only values at the same location in past frames of the video sequence but also neighbouring values in the current frame, is constructed for each vector of coefficients having components in each frame of the approximation subband, said vectorial coding feature coming from the fact that the lowest frequency subband contains spatial low frequency subbands from at least two frames;

(b) said DPCM uses constant prediction coefficients;

(B) the quantification of the prediction error is carried out by means of a scalar quantization of the two vector components, followed by an assignment of a unique binary code associated to the probability computed for each given couple of quantized values;

(C) the binary stream resulting from the steps (A) and (B) is encoded by a lossless process minimizing the entropy of the whole message. In another embodiment, the invention relates to a similar method, but characterized in that:

(A) a vectorial differential pulse code modulation (DPCM) is used to separately encode the lowest frequency spatio-temporal subband, or approximation subband, according to the following conditions:

(a) a spatio-temporal predictor, using not only values at the same location in past frames of the video sequence but also neighbouring values in the current frame, is constructed for each vector of coefficients having components in each frame of the approximation subband, said vectorial coding feature coming from the fact that the lowest frequency subband contains spatial low frequency subbands from at least two frames;

(b) said DPCM uses constant prediction coefficients;

(B) the quantification of the prediction error is carried out by means of a vectorial quantization using an optimal quantizer based on a generalized Lloyd-Max algorithm, a joint Laplacian probability density function for the two components of the quantized prediction error vector being considered for said optimization;

(C) the binary stream resulting from the steps (A) and (B) is encoded by a lossless process minimizing the entropy of the whole message.

Whatever the embodiment, said DPCM may also be adaptive, the coefficients of the spatio-temporal predictor now taking into account scene changes by means of a least means squares estimation of these coefficients for each group of frames.

BRIEF DESCRIPTION OF THE DRAWINGS

The particularities and advantages of the invention will now be explained with reference to the following embodiment described hereinafter and considered in connection with the drawings, in which.

DETAILED DESCRIPTION OF THE INVENTION

With the 3D video scheme here proposed, the lowest frequency subband of the 3D spatio-temporal decomposition is independently coded, while the other subbands are encoded using the 3D SPIHT algorithm. This implies however some important modifications. One will focus here on the 3D structure, which is of interest for the invention.

Figure 1:
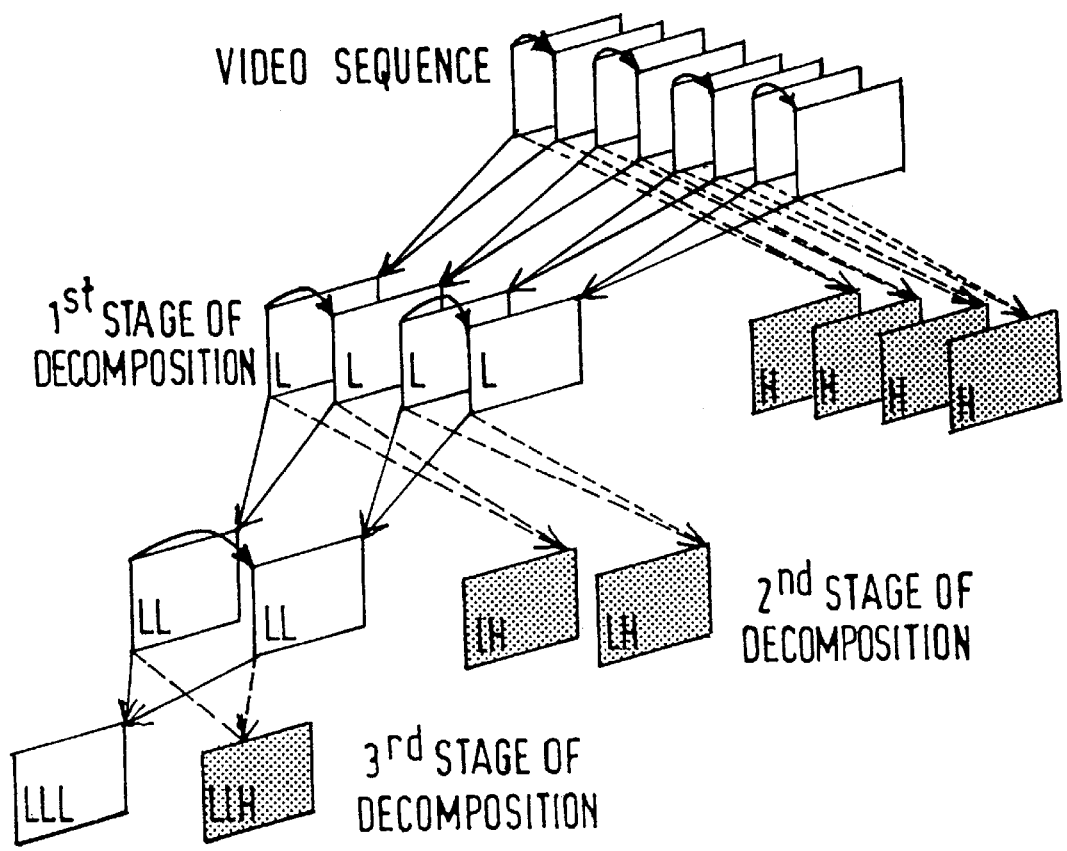
FIG. 1 illustrates the temporal subband decomposition of a group of 8 frames of the input video sequence in a tridimensional subband decomposition with motion compensation.
Figure 2:
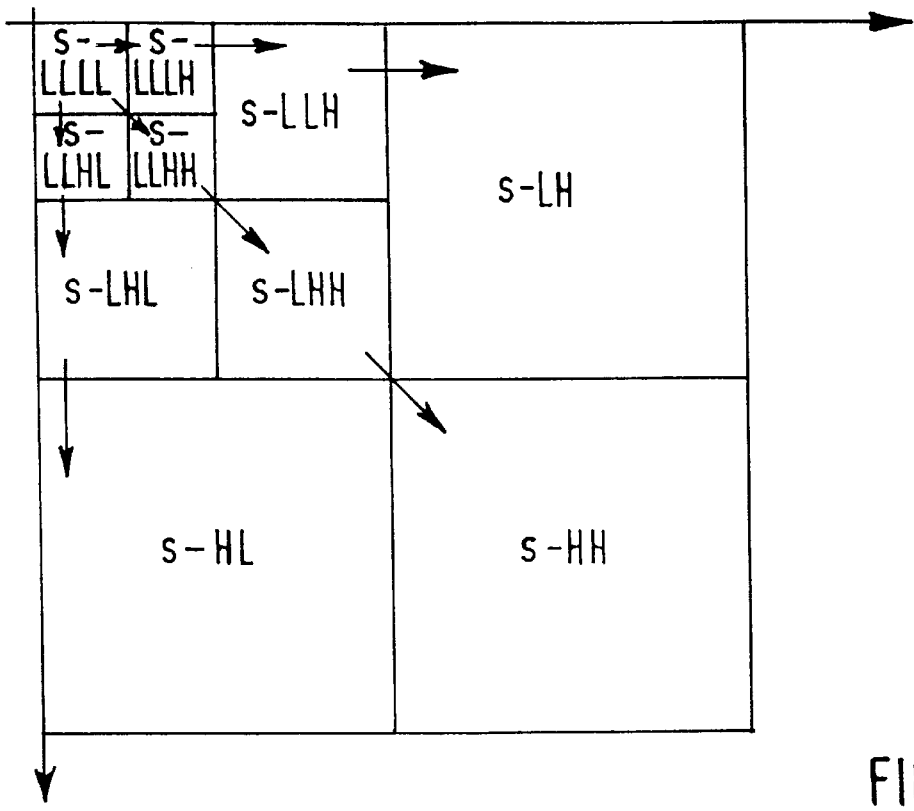
FIG. 2 shows spatial orientation trees in 2D-SPIHT, in the still picture case.
Figure 3:
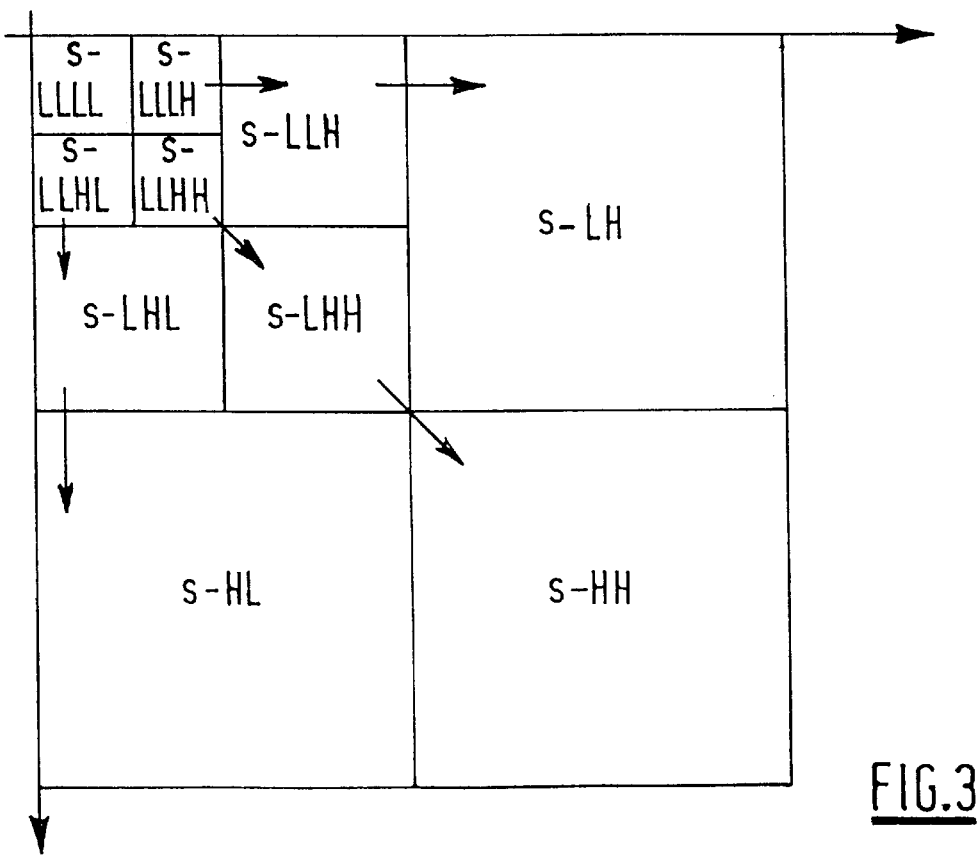
FIG. 3 shows MPEG-4 like spatial orientation trees for bidimensional zerotree coding (s-LLLL is coded separately)
Figure 4:
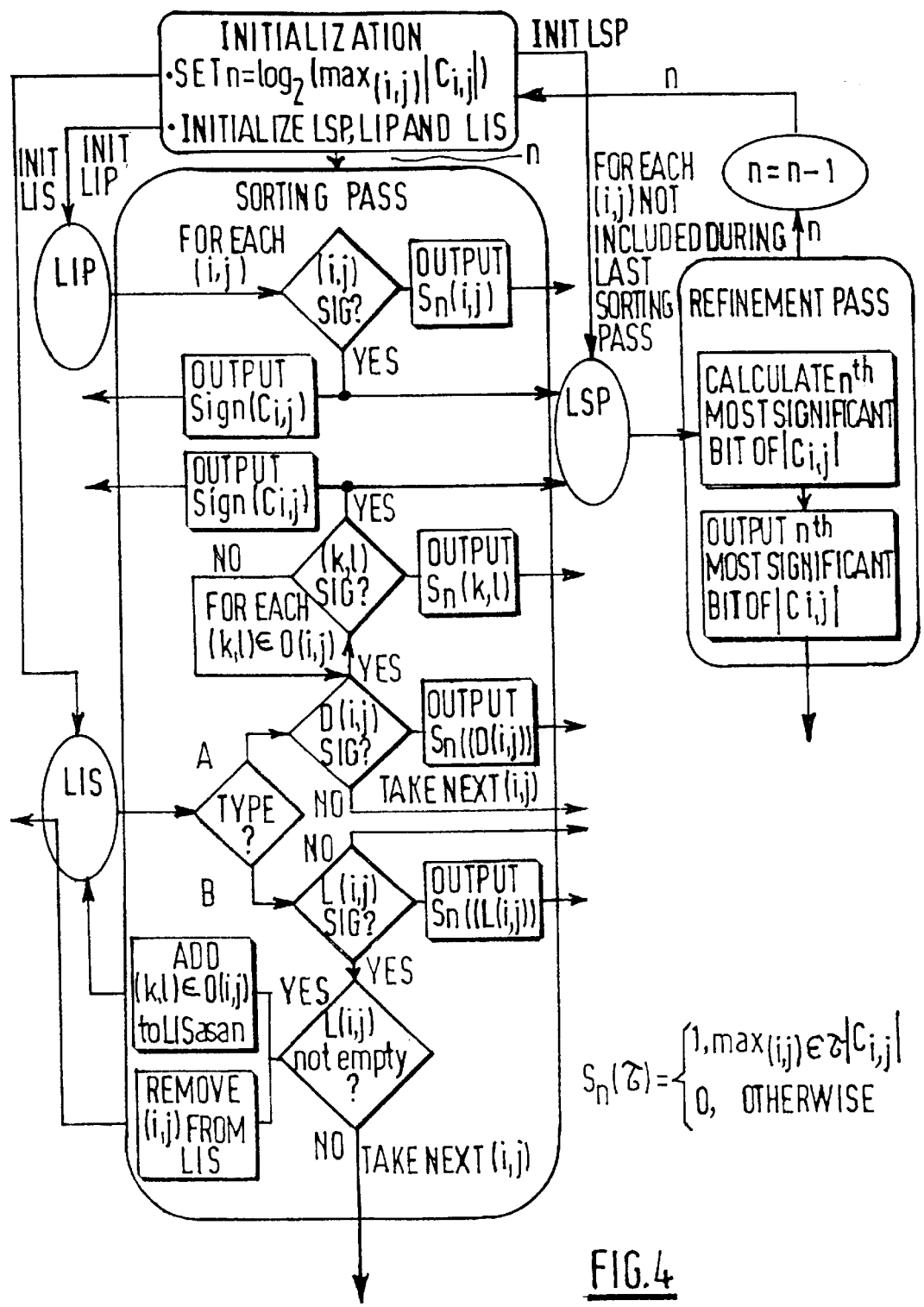
FIG. 4 illustrates a block diagram of the known SPIHT algorithm.

In this case, a specific feature of the SPIHT algorithm, a block diagram of which is illustrated in FIG. 4, will be recalled. For the lowest spatio-temporal subband, the parent-child relationships are defined as follows: blocks of 8 adjacent pixels are formed, comprising two pixels in each direction. Their offsprings are defined as the groups of 8 pixels corresponding to the same location in the 7 adjacent detail subbands. One pixel in the group of 8 has no offspring, while every other pixels have a block of 8 pixels as offsprings. If one denotes by M, N, T the dimensions of the initial group of frames, and one considers J decomposition levels, then the dimension of the lowest frequency subband is $M_j=M/2^J$, $N_J=N/2^J$, $T_J=T/2^J$. The offsprings of the coefficient located at (i,j,k) in the lowest frequency subband are:

$O=\{(i-1+M_J,j-1+N_J,k-1+T_J), (i+M_J,j-1+N_J,k-1+T_J), (i-1+M_J,j+N_J,k-1+T_J), (i+M_J,j+N_J,k-1+T_J), (i-1+M_J,j-1+N_J,k+T_J), (i+M_J,j-1+N_J,k+T_J), (i-1+M_J,j+N_J,k+T_J), (i+M_J,j+N_J,k+T_J)\}$.

Trees are therefore formed taking as roots the pixels in the lowest frequency subband. This technique used in 3D video coding was also implemented for the compression of 3D medical images, but in this case the motion estimation and compensation stage was skipped.

Figure 5:
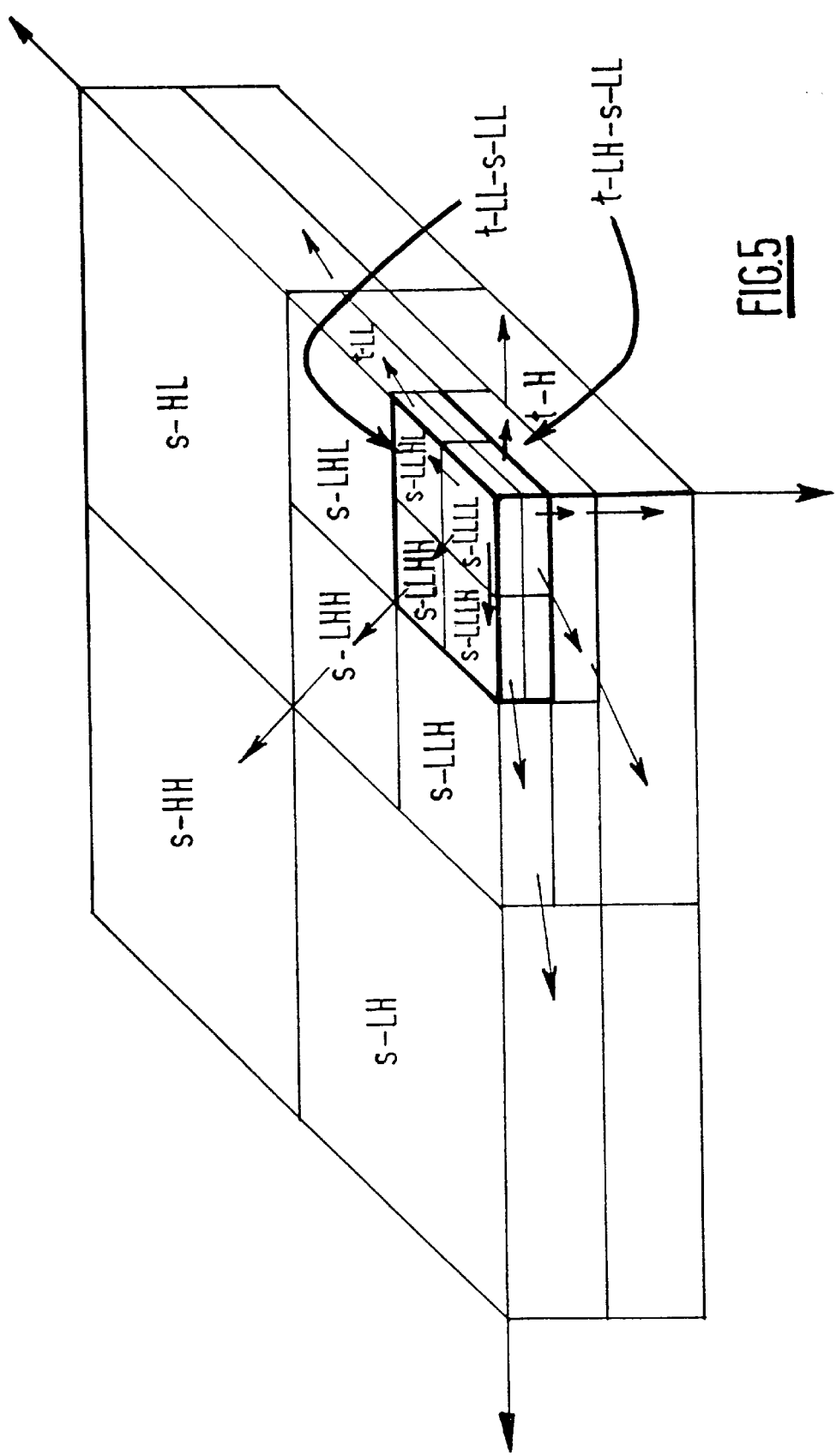
FIGS. 5 and 6 show respectively spatio-temporal orientation trees in 3D-SPIHT and modified spatio-temporal orientation trees.
Figure 6:
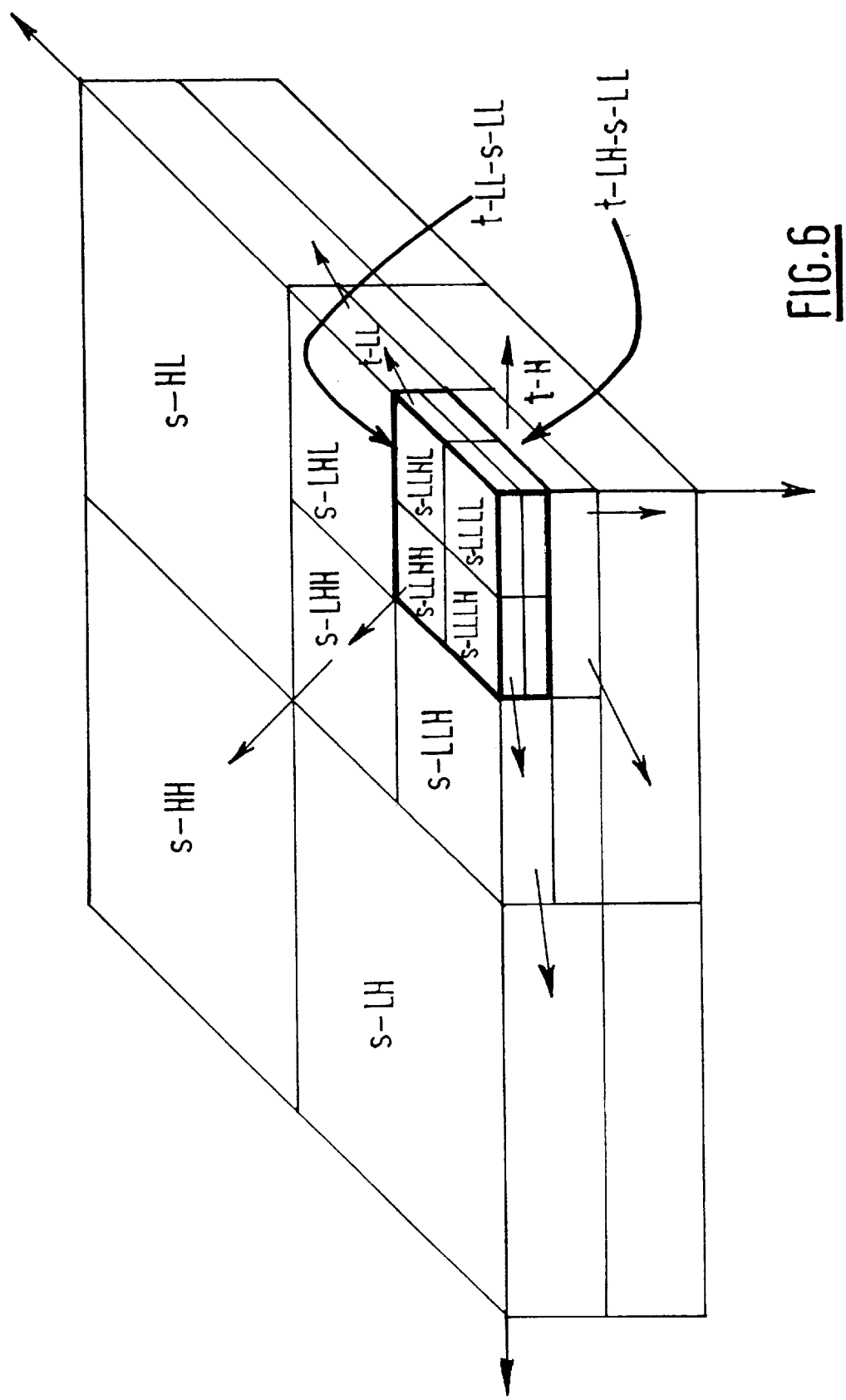
Figure 7:
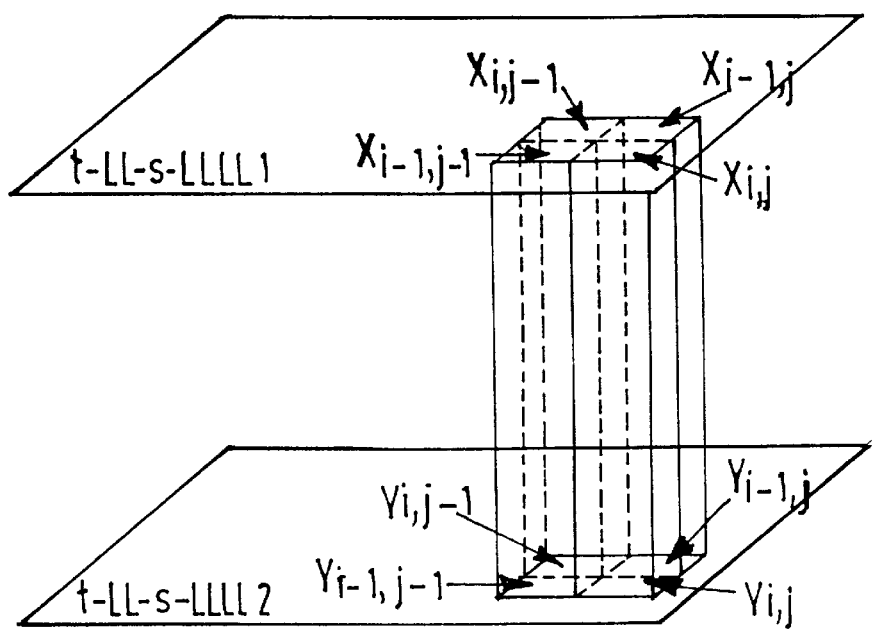
FIG. 7 shows the pixels used for constructing the spatio-temporal predictor in the vectorial DPCM coding of the two frames in the lowest subband.

In this framework, the modification here proposed (FIG. 6) to the 3D SPIHT algorithm (FIG. 5) is to independently encode the lowest spatio-temporal subband t-LL-s-LLLL. As this subband contains the lowest spatial frequency subbands of the two frames in the lowest temporal subband, the information in this band can be seen as vectorial information: pixels with the same indexes in the two spatial subbands are grouped into vectors which will inherit the same index. This is illustrated in FIG. 7 for the two frames contained in the lowest temporal subband and in particular for the lowest spatial frequency subband in these frames. In order to compress this information, it is proposed to use a vectorial adaptive DPCM (differential pulse code modulation) technique (it is clear that separately coding the two frames would result in lower performances).

The zerotree coding by set partitioning in hierarchical trees is used only for the encoding of the detail subbands. One exploits the observation that if a wavelet coefficient in a high level of the pyramid is insignificant with respect to a given threshold, then all the coefficients corresponding to the same spatio-temporal location in lower levels of the pyramid are also insignificant with respect to this threshold. Therefore, all these coefficients can be efficiently encoded with a single symbol, called a zerotree root. A wavelet coefficient is called significant with respect to a threshold if its absolute value is greater than the threshold, and insignificant otherwise. For the transmission, the wavelet coefficients are ranked according to their binary representation and the most significant bits are sent first.

The vectorial adaptive DPCM technique used to encode the lowest spatio-temporal frequency subband will be now described. To this end, one denotes by (i,j) the coordinates of the current pixel in the lowest frequency subband and by $x_{i,j}$, $y_{i,j}$ the values of the coefficients at this index in the first, respectively second frame of the lowest temporal subband (see FIG. 7). A linear spatio-temporal predictor for the vector $$s_{i,j} = \begin{pmatrix} x_{i,j} \\ y_{i,j} \end{pmatrix}$$

is constructed based on the following equation, with (n, m) ∈Λ:

$$s_{i,j}^P = \sum_{n,m} P_{n,m} \cdot s_{i-n,j-m} \quad (1)$$

where:

$$s_{i-n,j-m} = \begin{pmatrix} x_{i-n,j-m} \\ y_{i-m,j-m} \end{pmatrix},$$

are the nearest neighbours of:

$$s_{i,j} = \begin{pmatrix} x_{i,j} \\ y_{i,j} \end{pmatrix},$$

$$s_{i,j}^P = \begin{pmatrix} x_{i,j}^P \\ y_{i,j}^P \end{pmatrix}$$

represents the predictor of $$s_{i,j} = \begin{pmatrix} x_{i,j} \\ y_{i,j} \end{pmatrix}$$

and $$P_{n,m} = \begin{pmatrix} a_{n,m} & b_{n,m} \\ c_{n,m} & d_{n,m} \end{pmatrix}$$

are the matrices of the predicition coefficients.
For example, in reference to FIG. 7, one has:

$$s_{i,j}^P = P_{1,1} \cdot s_{i-1,j-1} + P_{1,0} \cdot s_{i-1,j} + P_{0,1} \cdot s_{i,j-1} \quad (2)$$

where $P_{1,1} = \begin{pmatrix} a_{1,1} & b_{1,1} \\ c_{1,1} & d_{1,1} \end{pmatrix}$, $P_{1,0} = \begin{pmatrix} a_{1,0} & b_{1,0} \\ c_{1,0} & d_{1,0} \end{pmatrix}$, $P_{0,1} = \begin{pmatrix} a_{0,1} & b_{0,1} \\ c_{0,1} & d_{0,1} \end{pmatrix}$ In Equation (2), the coefficients $a_{1,1}, a_{1,0}, a_{0,1}$ realize a spatial prediction in frame 1, $d_{1,1}, d_{1,0}, d_{0,1}$ form a spatial prediction in frame 2, while the coefficients denoted by $b_{1,1}, b_{1,0}, b_{0,1}$ and $c_{1,1}, c_{1,0}, c_{0,1}$ correspond to spatio-temporal predictions. In Equation (1), fixed prediction coefficients may be used.

Another possible implementation is to find the optimum of the prediction coefficients for each group of frames, based on minimizing the mean square error of the prediction error. This is an adaptive strategy, and better results than in the fixed case are obtained, at the expense of the computational complexity. The prediction error is the difference between the real value of the vector $s_{i,j}$ and its predicted value $s_{i,j}^P$. The prediction error can be vectorially quantized using an optimal quantizer based on a generalized Lloyd-Max algorithm. A simple choice is to consider for the optimization a joint Laplacian probability density function for the two components of the quantized prediction error vector.

Figure 8:
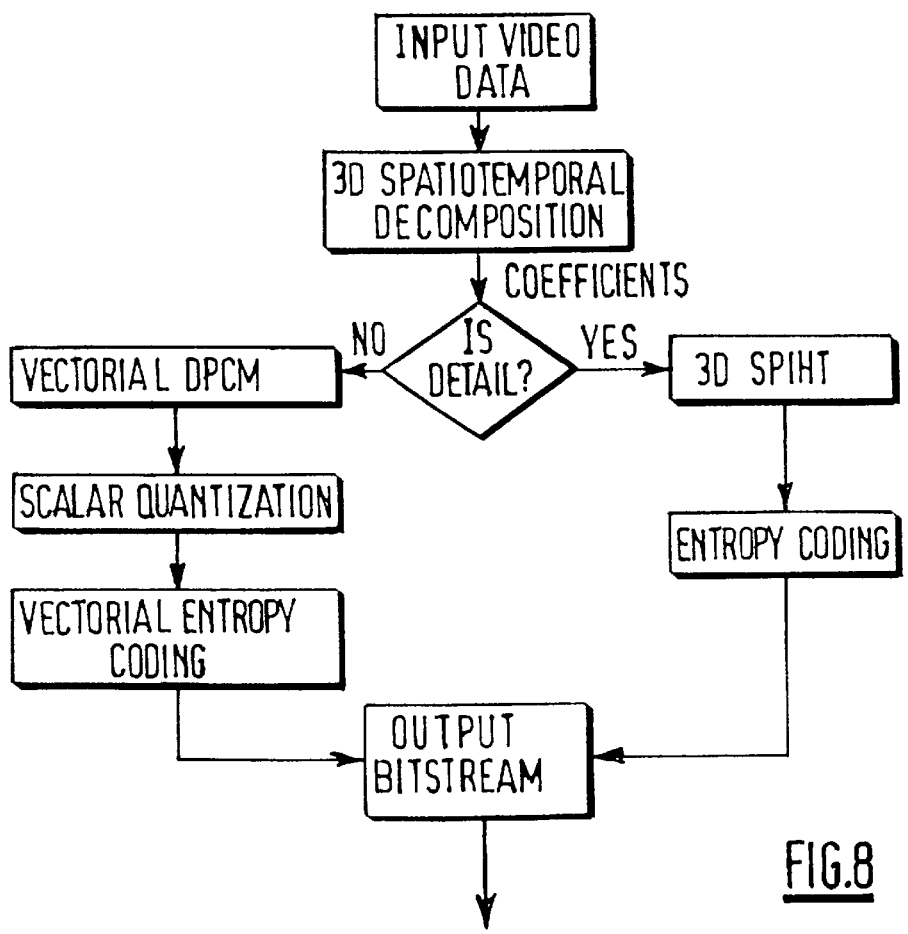
FIG. 8 illustrates a block diagram of the encoding method according to the invention.

The implementation chosen here is based on a scalar quantization of the two vector components, followed by the assignment of a unique binary code for the couple of components. This is possible if for each couple of quantized values one computes the probability of this event and associates to it a unique binary code, minimizing the entropy of the message. A technique for choosing this code is the arithmetic entropy coding, described for example in "Arithmetic coding for data compression", I. H. Witten and al., Communications of the ACM, June 1987, vol.30, N.6, pp. 520–540. The global diagram of the proposed video coding system is presented in FIG. 8, where it clearly appears that only the lowest frequency subband (detected by the test "is detail ?") of the 3D spatio-temporal decomposition is independently coded, after a scalar quantization, by means of a vectorial entropy coding.

The other subbands are processed by means of the 3D SPIHT algorithm and then entropy coded. These detail subbands are then encoded using the concept of zerotrees developed in the document "Embedded image coding . . . " already cited, the main lines of implementation being the same as defined in the SPIHT algorithm for comparing sets of coefficients with decreasing thresholds. The first threshold is chosen as a power of two $2^{n_{max}}$ such that the maximum value of all the wavelet coefficients, say M, is $2^{n_{max}} \leq M \leq 2^{n_{max}+1}$. Wavelet coefficients are compared with this threshold following a predefined order, which is known at both the encoder and the decoder sides. It is thus not necessary to transmit it in the bitstream. For example, with the notations in FIG. 6, the scanning order of the spatio-temporal subbands could be: t-LL-s-LLLH, t-LL-s-LLHL, t-LL-s-LLHH, t-LH-s-LLLL, t-LH-s-LLLH, t-LH-s-LLHL, t-LH-s-LLHH, t-LL-s-LLH, t-LL-s-LHL, t-LL-s-LHH, t-LH-s-LLH, t-LH-s-LHL, t-LH-s-LHH, and so on. Other scanning order of the subbands are possible. Inside each subband, a simple solution is to use a rast order of scanning. Indeed, other scanning strategies may be implemented, corresponding to the priviledged orientation of the details in each subband: horizontal for subbands whose last indexing letters are LL and LH, vertical scanning for HL and diagonal scanning for HH.

The drawings and their description have illustrated rather than limited the invention, and it is clear that numerous alternatives may be proposed without falling out of the scope of said invention. It must be for instance indicated that the invention is not limited by the number and position of the neighbouring pixels considered for the spatio-temporal predictor, the method used for the motion estimation and compensation, the type of linear wavelet transform used for the tridimensional analysis and synthesis, or the adaptation algorithm allowing to compute the predictor coefficients.

What is claimed is:

1. An encoding method for the compression of a video sequence divided in groups of frames decomposed by means of a tridimensional (3D) wavelet transform leading to a given number of successive resolution levels, said method being based on a hierarchical subband encoding process called "set partitioning in hierarchical trees" (SPIHT) and leading from the original set of picture elements (pixels) of each group of frames to transform coefficients encoded with a binary format and constituting a hierarchical pyramid, said coefficients being ordered by means of magnitude tests involving the pixels represented by three ordered lists called list of insignificant sets (LIS), list of insignificant pixels (LIP) and list of significant pixels (LSP), said tests being carried out in order to divide said original set of picture elements into partitioning subsets according to a division process that continues until each significant coefficient is encoded within said binary representation, and a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, said method, applied to the band-pass subbands of the spatio-temporal tree, being further characterized in that:

(A) a vectorial differential pulse code modulation (DPCM) is used to separately encode the lowest frequency spatio-temporal subband, or approximation subband, according to the following conditions:

(a) a spatio-temporal predictor, using not only values at the same location in past frames of the video sequence but also neighbouring values in the current frame, is constructed for each vector of coefficients having components in each frame of the approximation subband, said vectorial coding feature coming from the fact that the lowest frequency subband contains spatial low frequency subbands from at least two frames;

(b) said DPCM uses constant prediction coefficients;

(B) the quantification of the prediction error is carried out by means of a scalar quantization of the two vector components, followed by an assignment of a unique binary code associated to the probability computed for each given couple of quantized values;

(C) the binary stream resulting from the steps (A) and (B) is encoded by a lossless process minimizing the entropy of the whole message.

2. An encoding method for the compression of a video sequence divided in groups of frames decomposed by means of a tridimensional (3D) wavelet transform leading to a given number of successive resolution levels, said method being based on a hierarchical subband encoding process called "set partitioning in hierarchical trees" (SPIHT) and leading from the original set of picture elements (pixels) of each group of frames to transform coefficients encoded with a binary format and constituting a hierarchical pyramid, said coefficients being ordered by means of magnitude tests involving the pixels represented by three ordered lists called list of insignificant sets (LIS), list of insignificant pixels (LIP) and list of significant pixels (LSP), said tests being carried out in order to divide said original set of picture elements into partitioning subsets according to a division process that continues until each significant coefficient is encoded within said binary representation, and a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, said method, applied to the band-pass subbands of the spatio-temporal tree, being further characterized in that:

(A) a vectorial differential pulse code modulation (DPCM) is used to separately encode the lowest frequency spatio-temporal subband, or approximation subband, according to the following conditions:

(a) a spatio-temporal predictor, using not only values at the same location in past frames of the video sequence but also neighbouring values in the current frame, is constructed for each vector of coefficients having components in each frame of the approximation subband, said vectorial coding feature coming from the fact that the lowest frequency subband contains spatial low frequency subbands from at least two frames;

(b) said DPCM uses constant prediction coefficients;

(B) the quantification of the prediction error is carried out by means of a vectorial quantization using an optimal quantizer based on a generalized Lloyd-Max algorithm, a joint Laplacian probability density function for the two components of the quantized prediction error vector being considered for said optimization;

(C) the binary stream resulting from the steps (A) and (B) is encoded by a lossless process minimizing the entropy of the whole message.

3. An encoding method according to claim 1, in which said DPCM becomes adaptive, the coefficients of the spatio-temporal predictor now taking into account scene changes by means of a least means squares estimation of these coefficients for each group of frames.

4. An encoding method according to claim 3, in which a decision is taken about the fact that the predictor is most influenced by the spatial prediction or by the temporal one.

5. An encoding method according to claim 1, in which said lossless process is based on arithmetic encoding.

6. An encoding method according to claim 1, in which said lossless process is based on a Huffmann encoding.

* * * * *